United States Patent

Kubo

[11] Patent Number: 5,490,147
[45] Date of Patent: * Feb. 6, 1996

[54] FRAME ALIGNMENT CIRCUIT

[75] Inventor: Kazuo Kubo, Kamakura, Japan

[73] Assignee: Mitsubishi Denki Kabushiki Kaisha, Tokyo, Japan

[*] Notice: The portion of the term of this patent subsequent to Jul. 5, 2011, has been disclaimed.

[21] Appl. No.: 222,522

[22] Filed: Apr. 4, 1994

Related U.S. Application Data

[63] Continuation of Ser. No. 957,591, Oct. 6, 1992, Pat. No. 5,327,434.

[30] Foreign Application Priority Data

Mar. 17, 1992 [JP] Japan .................................. 4-060062

[51] Int. Cl.$^6$ ..................................................... H04J 3/06
[52] U.S. Cl. ................................... 370/105.1; 370/105.2; 370/105.3; 370/106; 375/354; 375/368
[58] Field of Search .............................. 370/105.1, 105.2, 370/105.3, 105.4, 105.5, 106, 100.1; 375/354, 362, 365, 371, 368

[56] References Cited

U.S. PATENT DOCUMENTS 3,909,541 9/1975 Bobilin .
4,920,546 4/1990 Iguchi et al. ............................. 370/106
5,327,434 7/1994 Kubo ..................................... 370/105.2

FOREIGN PATENT DOCUMENTS 63-244948 of 1988 Japan .

OTHER PUBLICATIONS

Design Considerations of Broadband Access System Components K. Murano, T. Soejima, K. Iguchi, T. Tsuda, M. Ohhata, Globecom '87 pp. 13.6.1–6 1987.

Primary Examiner—Melvin Marcelo
Assistant Examiner—Huy D. Vu
Attorney, Agent, or Firm—Wolf, Greenfield & Sacks

[57] ABSTRACT

A frame alignment circuit including at least a first series-to-parallel data converter having a shift register for accumulating series data, a latch circuit for converting the accumulated data into parallel data and a variable counter for dividing a clock signal into a divided clock signal. The frame alignment circuit further includes a pattern detector which detects a frame alignment pattern of the parallel data, a determining circuit which determines a deviation of alignment based on a reference frame alignment signal and the detected frame alignment pattern and a shift controlling circuit for controlling at least a dividing ratio of the variable counter based on a deviation of alignment signal output by the frame alignment circuit.

3 Claims, 12 Drawing Sheets

| PARALLEL EXPANSION PHASE DEVIATION | | 0 | 1 | 2 | 3 | 4 | 5 | 6 | 7 |
|---|---|---|---|---|---|---|---|---|---|
| ENCODE SIGNAL | S12 | 0 0 0 | 0 0 1 | 0 1 0 | 0 1 1 | 1 0 0 | 1 0 1 | 1 1 0 | 1 1 1 |
| SHIFTING SIGNAL | S6 | 0 | 0 | 1 | 1 | 2 | 2 | 3 | 3 |
| SELECTING SIGNAL | S4 | 0 | 1 | 0 | 1 | 0 | 1 | 0 | 1 |

| Parallel expansion phase deviation | 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|---|
| Encoded signal S12 | 0 | 0 | 0 | 0 | 1 | 1 | 1 | 1 | 0 | 0 | 0 | 0 | 1 | 1 | 1 | 1 |
|  | 0 | 0 | 1 | 1 | 0 | 0 | 1 | 1 | 0 | 0 | 1 | 1 | 0 | 0 | 1 | 1 |
|  | 0 | 1 | 0 | 1 | 0 | 1 | 0 | 1 | 0 | 1 | 0 | 1 | 0 | 1 | 0 | 1 |
| Selecting signal (before recovery of alignment) S4 | 0 | 0 | 0 | 0 | 0 | 0 | 0 | 0 | 1 | 1 | 1 | 1 | 1 | 1 | 1 | 1 |
| Calculation signal S13 | 0 | 0 | 0 | 0 | 0 | 0 | 0 | 0 | 0 | 0 | 0 | 0 | 0 | 0 | 0 | 1 |
|  | 0 | 0 | 0 | 0 | 0 | 0 | 1 | 1 | 0 | 0 | 0 | 0 | 1 | 1 | 1 | 0 |
|  | 0 | 0 | 1 | 1 | 1 | 1 | 1 | 1 | 0 | 0 | 1 | 1 | 0 | 1 | 1 | 0 |
|  | 0 | 1 | 0 | 0 | 0 | 1 | 0 | 1 | 0 | 1 | 0 | 0 | 1 | 0 | 1 | 0 |
| Shifting signal S6 | 0 | 0 | 1 | 1 | 2 | 2 | 3 | 3 | 0 | 1 | 1 | 2 | 2 | 3 | 3 | 4 |
| Selecting signal (after recovery of alignment) S4 | 0 | 1 | 0 | 1 | 0 | 1 | 0 | 1 | 1 | 0 | 1 | 0 | 1 | 0 | 1 | 0 |

FRAME ALIGNMENT CIRCUIT

This application is a continuation of application Ser. No. 07/957,591 filed Oct. 6, 1992, now U.S. Pat. No. 5,327,434.

The present invention relates to a frame alignment circuit which performs frame alignment in a digital communication device, especially a receiving unit of a high-speed digital communication device.

Figure 9:
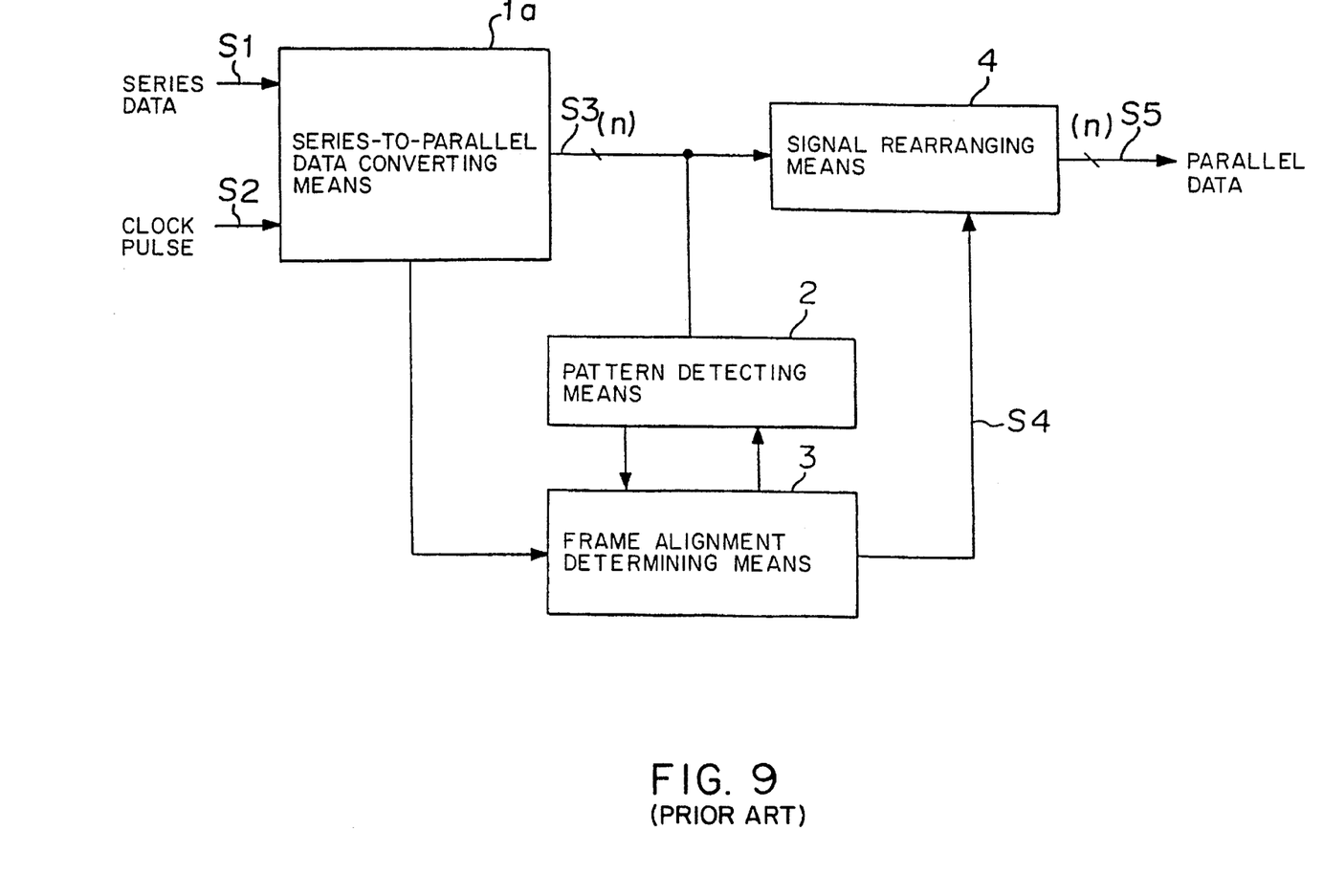
FIG. 9 is a construction diagram showing a conventional frame alignment circuit.

FIG. 9 is a construction diagram showing a conventional frame alignment circuit shown, for instance, in Japanese Unexamined Patent Publication No. 157138/1989. In FIG. 9, a notation 1a designates a series-to-parallel data converting means for converting a series data S1 to a parallel data S3 of "n" bits at a speed of 1/n based on a clock pulse S2, and 2, a pattern detecting means for detecting a frame alignment pattern by receiving the parallel data S3. A numeral 3 designates a frame alignment determining means for controlling phase deviation of the frame alignment pattern detected by the pattern detecting means 2, including, for instance, a frame counter, a frame alignment protecting circuit and the like. A numeral 4 designates a signal rearranging means for controlling an order of the parallel data S3 in accordance with a selecting signal S4 which is outputted by the frame alignment determining means 3 and outputting a parallel data S5 in a predetermined order.

Next, explanation will be given to the operation. When the series data S1 is inputted, the series-to-parallel data converting means 1a converts the series data S1 to the parallel data S3 of "n" bits at a speed of 1/n based on the clock pulse S2, and outputs it to the signal rearranging means 4. On the other hand, the parallel data S3 of "n" bits is also received by the pattern detecting means 2. The pattern detecting means 2 is constructed by a plurality of a frame alignment detecting circuits operating at a speed of 1/n as is well-known, which detects the frame alignment pattern based on the received parallel data S3 and outputs the result to the frame alignment determining means 3. The frame alignment determining means 3 matches the timings of a frame alignment pattern detecting position detected by the pattern detecting means 2 and of the frame counter, and performs a well-known front and rear protection.

At this moment, there is a case wherein the parallel data S3 which is series-to-parallel-converted by the series-to-parallel data converting means 1a at recovery of alignment, is not expanded in parallel in a predetermined order. In that case, the frame alignment determining means 3 forms a selecting signal S4 which controls the order of the parallel data S3 and transmits it to the signal rearranging means 4. Based on this selecting signal S4, the signal rearranging means 4 rearranges the order of the parallel data S3 which is expanded by the series-to-parallel data converting means 1a. In this way, the matching of the frame alignment is performed and the parallel data S5 in a predetermined expanding order is outputted from the signal rearranging means 4.

Figure 10:
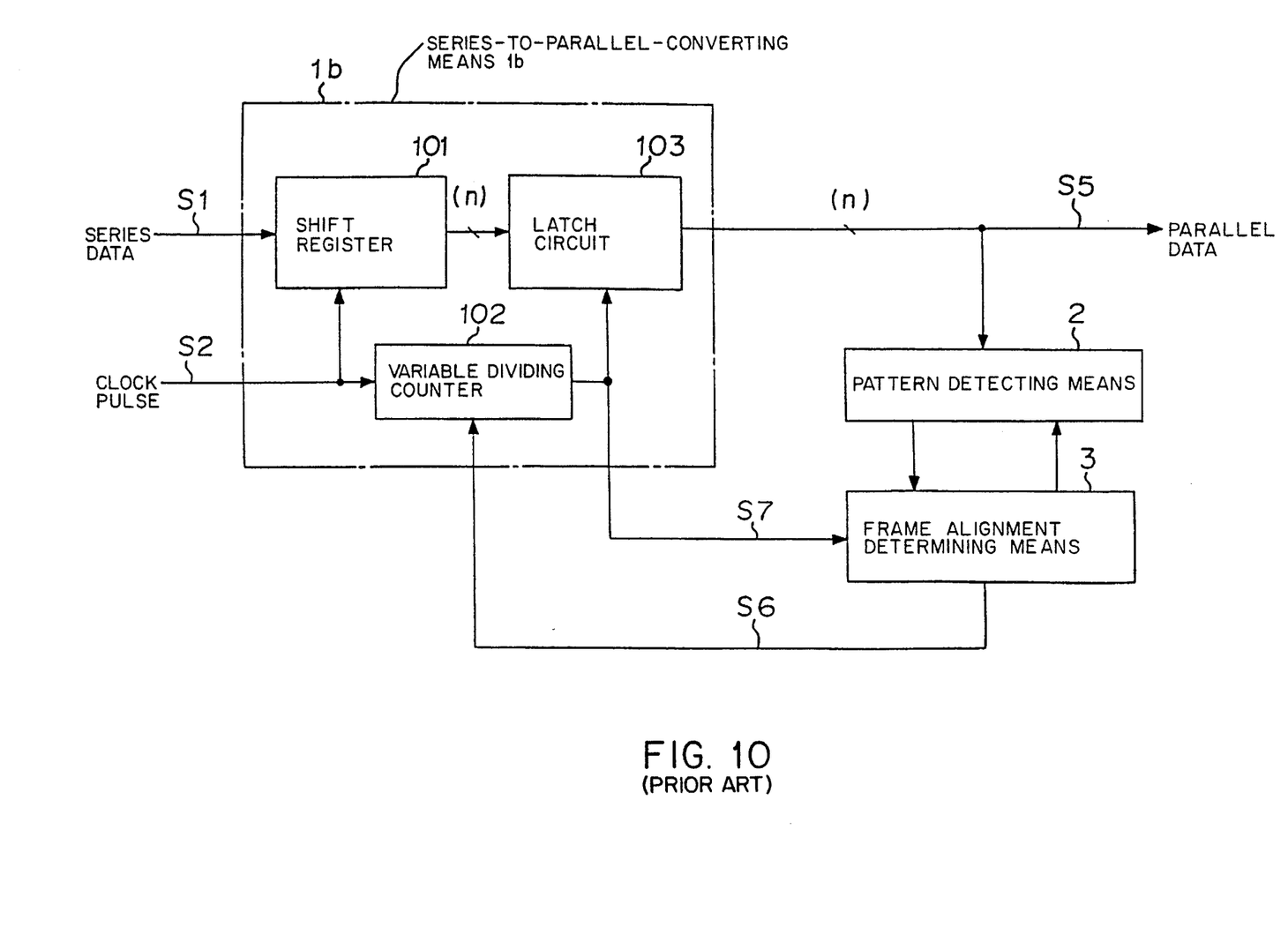
FIG. 10 is a construction diagram showing another conventional frame alignment circuit.

FIG. 10 is a construction diagram showing another conventional frame alignment circuit shown, for instance, in Japanese Patent Application No. 93371/1990. In FIG. 10, a notation 1b designates a series-to-parallel converting means composed of a shift register 101, a variable dividing counter 102 and a latch circuit 103 to be mentioned infra. A numeral 2 designates a pattern detecting means and 3, a frame alignment determining means which are portions equivalent with those attached with the same notations in FIG. 9. The numeral 101 designates the shift register of "n" bits for accumulating a received series data S1 while successively shifting it in accordance with a clock pulse S2. The numeral 102 designates a variable dividing counter a divided ratio of which is controlled by a shifting signal S6 from the frame alignment determining means 3, and which forms a divided clock signal S7 by dividing the clock pulse S2 by the dividing ratio. The numeral 103 designates a latch circuit for latching an output signal of "n" bits from the shift register 101 based on the divided clock signal S7 generated by the variable dividing counter 102 and expanding it to a parallel data S5 of "n" bits.

Figure 11:
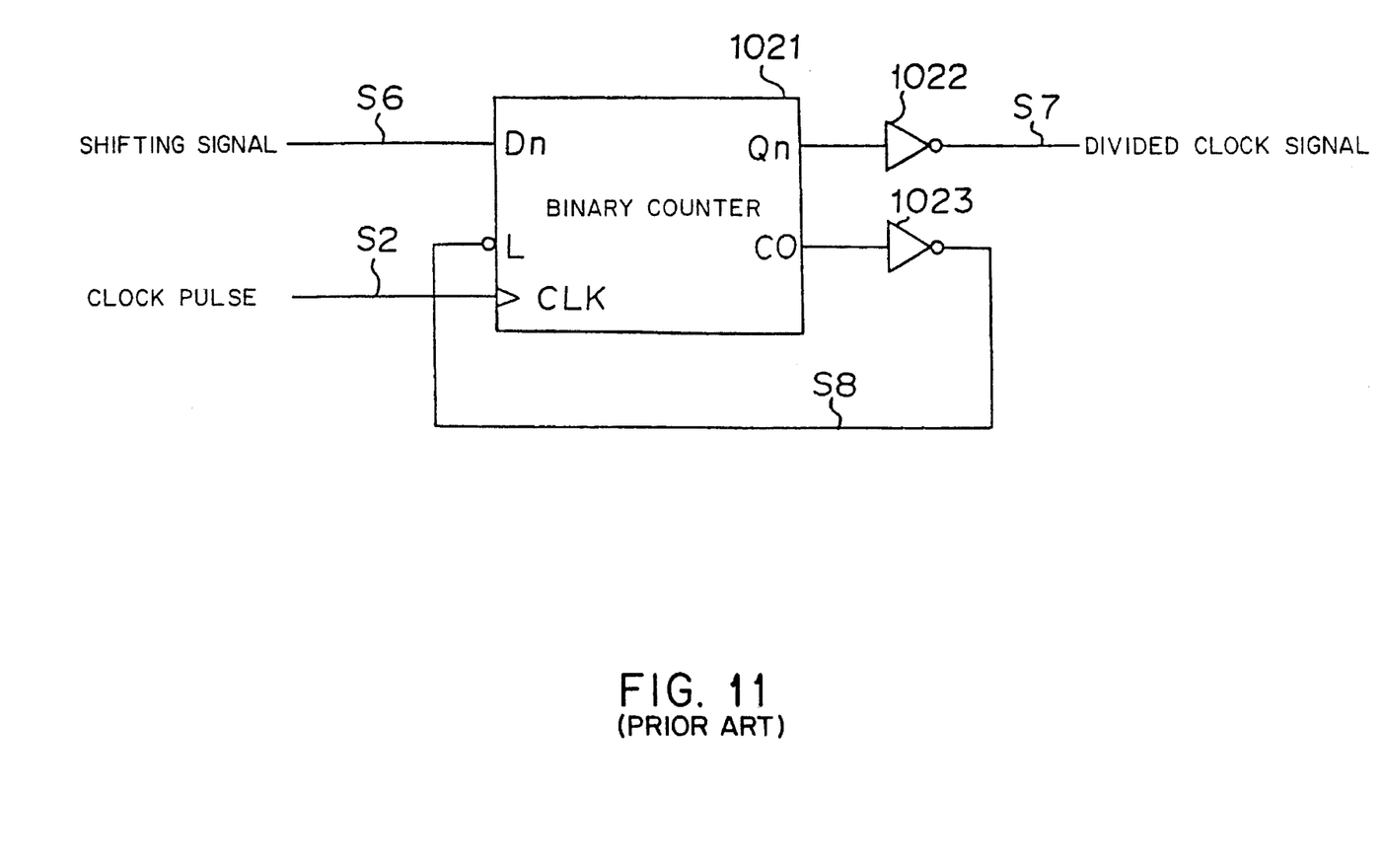
FIG. 11 is a construction diagram showing a variable dividing counter in the conventional frame alignment circuit.

FIG. 11 is a construction diagram showing construction of the variable dividing counter 102. In FIG. 11, a numeral 1021 designates a general binary counter with presetting and 1022 and 1023, inverters. The shifting signal S6 is inputted to a terminal Dn of the binary counter 1021, the clock pulse S2 is inputted to a terminal CLK, and an output from a terminal CO is inputted to a terminal L through the inverter 1023 as a load signal S8. The inverter 1022 for outputting a divided clock signal S7 is connected to a terminal Qn.

Next, explanation will be given to the operation. The dividing ratio of the variable dividing counter 102 is set to "n".

The received series data S1 is successively accumulated in the shift register 101 while being shifted by the clock pulse S2. Since the dividing ratio of the clock pulse S2 is set to "n" as mentioned supra, the divided clock signal S7 is generated at every "n" cycle of the clock pulse S2. The latch circuit 103 latches all of the data currently stored in the shift register 101 in accordance with the divided clock signal S7 from the variable dividing counter 102. The data latched in the latch circuit 103 is expanded in parallel and outputted as the parallel data S5.

The parallel data S5 is also received by the pattern detecting means 2, which performs the detection of the frame alignment pattern. The detection result by the pattern detecting means 2 is transmitted to the frame alignment determining means 3. The frame alignment determining means 3 matches the timings of a frame alignment pattern detecting position of the pattern detecting means 2 and of an incorporated frame counter and performs the well-known front and rear protection.

Figure 12:
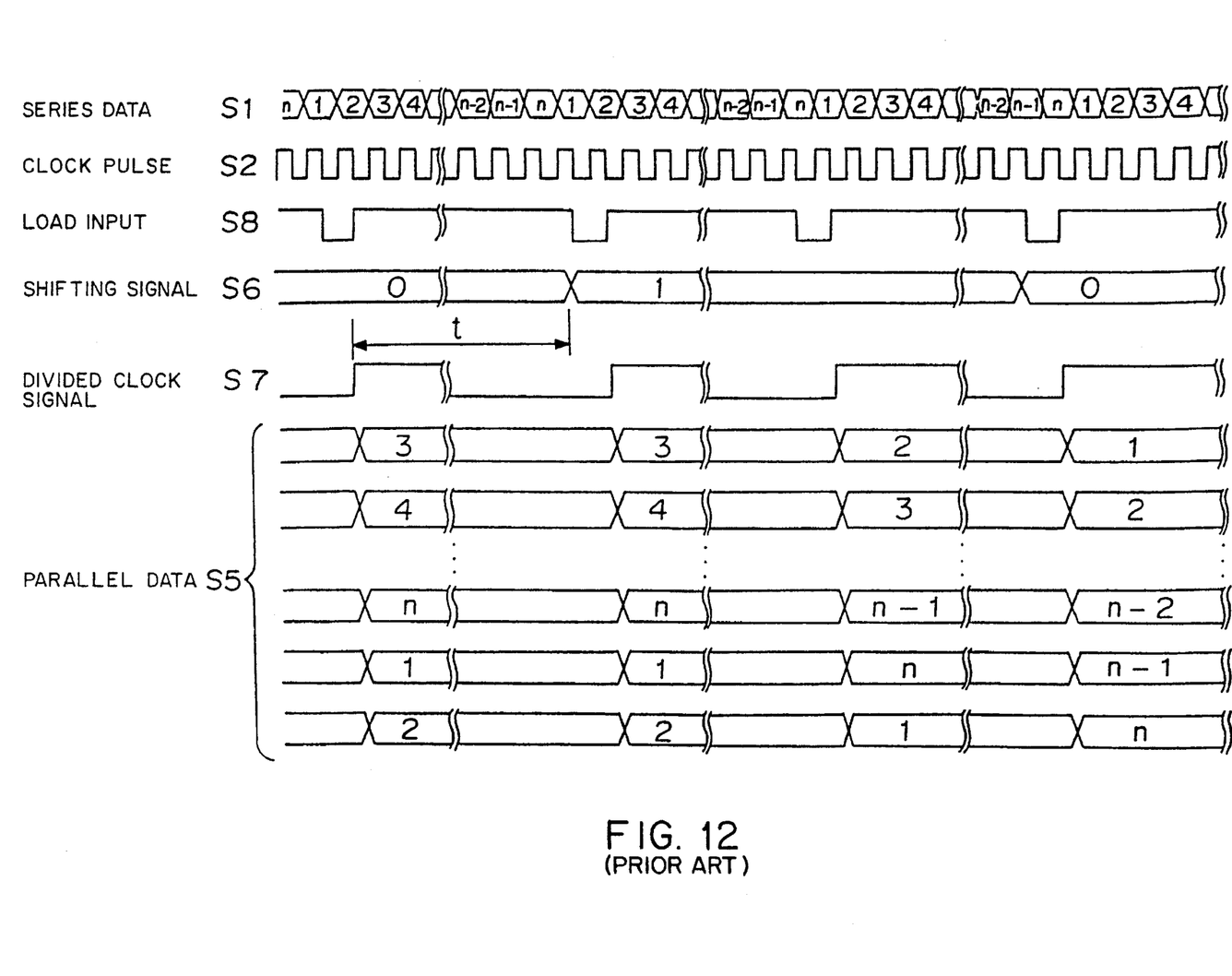
FIG. 12 illustrates timing charts for explaining rearranging of parallel data in the conventional frame alignment circuit.

At this moment, when the parallel data S5 is not parallelly expanded in a predetermined order at recovery of the frame alignment, the frame alignment determining means 3 which detects this disorder, changes the dividing ratio by the shifting signal S6 to the variable dividing counter 102. FIG. 12 illustrates timing charts for explaining the rearranging of the parallel data S5 by the variable dividing counter 102 at that moment. In this case, explanation will be given to a case wherein the parallel data expansion order is deviated by 2 bits from a predetermined one.

The variable dividing counter 102 presets a value of "1" of the shifting signal S6 to the binary counter 1021 at the generation of the load signal S8, when the shifting signal S6 from the frame alignment determining means 3 is changed from "0" to "1". Accordingly, the divided ratio of the variable dividing counter 102 is changed from "n" to "n−1", the timing of receiving the series data to the shift register is advanced by a single unit timing for one latching. This advancement is performed twice. The rearranging of the parallelly expanded order of the parallel data S5 is successively performed. After the second cycle thereof, the parallel data S5 is in a predetermined parallelly expanded order. When the parallel data S5 is in the predetermined parallelly expanded order, the frame alignment determining means 3 resets the shift signal S6 to "0" and sets the divided ratio of the variable dividing counter 102 to "n". In this way, the parallel data S5 maintains the predetermined parallelly expanded order and the frame alignment can be provided.

The delay time "t" which is allowable in the controlled shifting signal S6, is approximately equal to the cycle of the divided clock signal S7. Therefore, the circuit performing the control can be operated by the divided clock signal S7 thereby enabling to construct it by low-speed circuit elements.

Figure 13:
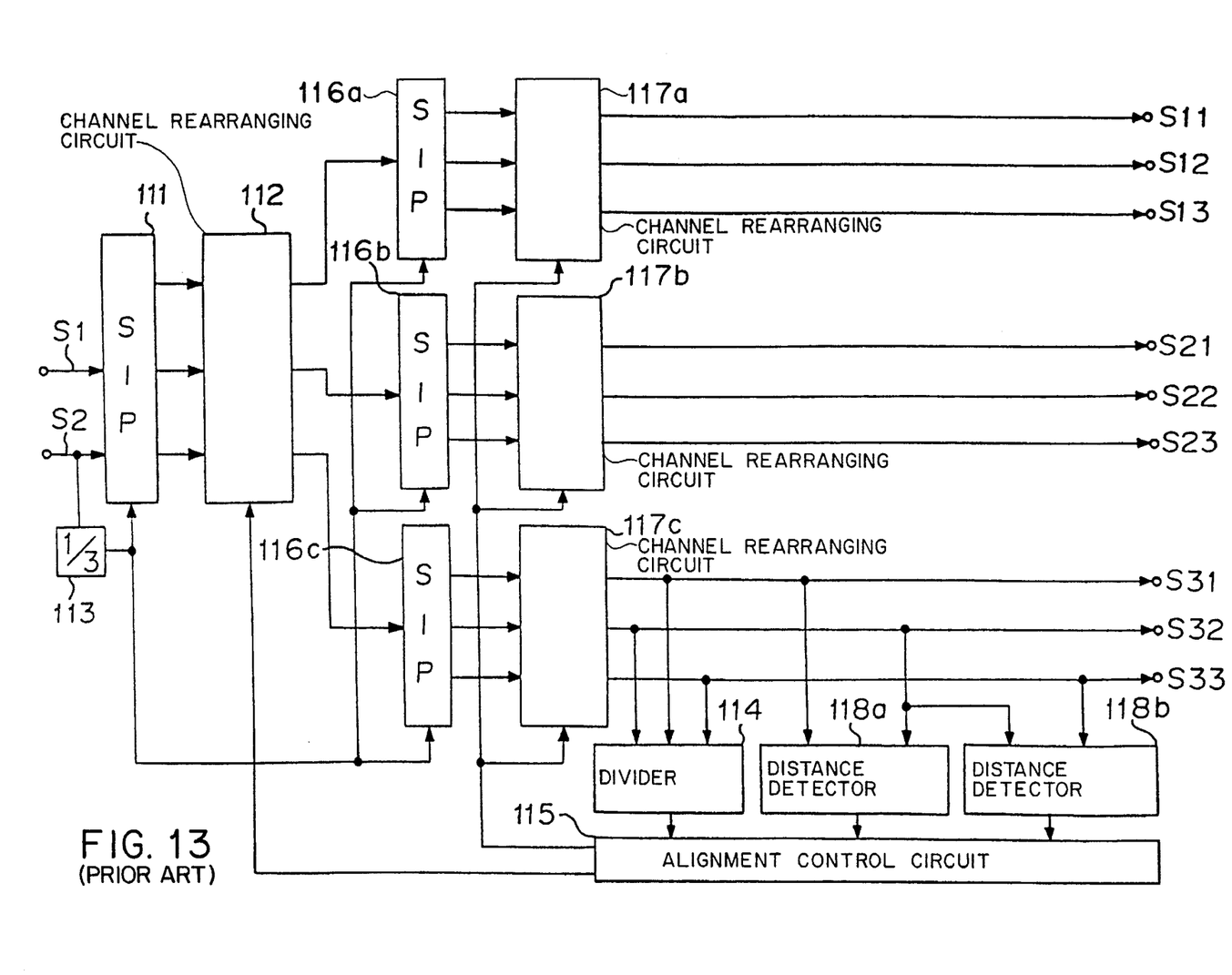
FIG. 13 is a construction diagram showing another conventional frame alignment circuit.

FIG. 13 is a construction diagram showing another conventional frame alignment circuit shown, for instance, in Japanese Unexamined Patent Publication No. 244948/1988. In FIG. 13, notations 111 and 116a through 116c designate series-to-parallel data converting circuits, 112 and 117a through 117c, channel rearranging circuits, 113, ⅓ dividing circuit, 114, a divider, 115, an alignment control circuit and 118a and 118b, distance detectors.

In the frame alignment circuit shown in FIG. 13, the series-to-parallel data converting circuits 111 and 116a through 116c and the channel rearranging circuits 112 and 117a through 117c which respectively perform the operations similar to the series-to-parallel data converting means 1a and the signal rearranging means 4 shown in FIG. 9, are connected in two stages, the divider 114, the alignment control circuit 115 and the distance detectors 118a and 118b are arranged after the second stages and an order of the parallel signals S11 through S33 are rearranged in the two stages, thereby establishing the frame alignment.

Since the conventional frame alignment circuits are constructed as above, in the one shown in FIG. 9, only the series-to-parallel data converting means 1a is required to perform a high-speed operation by the clock pulse S2. Accordingly, the other circuits can be constructed by low-speed circuit elements, which is easy for design of setting the timing thereof. However, when a parallelly expanded number in the series-to-parallel data converting means 1a, is increased, the control of the signal rearranging means 4 becomes complicated and the circuit size thereof is magnified.

In the conventional Example shown in FIG. 10, only the shift register 101, the variable dividing counter 102 and the latch 103 constructing the series-to-parallel data converting means 1b is required to perform the high-speed operation by the clock pulse S2. Accordingly, the other circuits may be constructed by the low-speed circuit elements, which is easy in the timing design. Furthermore, even when the parallelly expanded number in the series-to-parallel data converting means 1b, is increased, the control thereof is easy wherein only the timing of receiving data is changed, which can be performed by a small-size circuit. However, since the operating speed of the variable dividing counter 102 is slow compared with the fixed dividing counter, when the clock pulse S2 is at a very high speed, the circuit construction in use of the variable dividing counter 102 becomes difficult.

Furthermore, in the conventional Example shown in FIG. 13, a plurality of the channel rearranging circuits 112 and 117a through 117c are necessary, which magnifies the circuit size.

According to a first aspect of the present invention, there is provided a frame alignment circuit comprising:

a first series-to-parallel data converting means comprising a first shift register for accumulating a series data, a first latch circuit for converting the series data into a first parallel data and a first counter for dividing a clock signal into a divided clock signal;

a second series-to-parallel data converting means comprising a second shift register for accumulating the first parallel data outputted from the first series-to-parallel data converting means, a second latch circuit for latching the first parallel data and outputting the first parallel data which is converted into a second parallel data and a second counter for further dividing the divided clock signal of the first counter;

a frame alignment determining means for detecting a deviation of alignment based on a frame alignment pattern; and a shift controlling means for controlling at least a divided ratio of the second counter based on the deviation of alignment outputted by the frame alignment determining means.

According to a second aspect of the present invention, there is provided a frame alignment circuit comprising:

at least one series-to-parallel data converting means comprising a shift register for accumulating a series data, a latch circuit for converting the series data into a parallel data and a counter for dividing a clock signal;

a frame alignment determining means for detecting a deviation of alignment based on a frame alignment pattern; and a frame alignment circuit provided with a shift controlling means for expanding the deviation of alignment outputted by the frame alignment determining means and outputting the expanded deviation of alignment divided at least into a divided ratio shifting signal of the counter of the series-to-parallel data converting means and a control signal to other alignment deviation controlling means.

In the first aspect of the invented frame alignment circuit, the inputted series data is converted to the parallel data whereby the elements at the later stage are provided with operable speeds, by the first series-to-parallel data converting means, which is processed by the second series-to-parallel data converting means at the later stage and expanded into the required sets of the parallel data, which are outputted. When the deviation of alignment is generated, the divided ratio of the second counter and the other control signal are controlled by the detected frame alignment deviation and the timing of the latching is changed in accordance with the necessity.

Furthermore, in the second aspect of the present invention, when the alignment deviation is generated, the divided ratio of the counter is changed in accordance with the necessity thereby changing the timing and the timing of outputting by the other alignment deviation controlling means is changed depending on cases.

EXAMPLE 1

Explanation will be given to an embodiment of the present invention referring to the drawings as follows.

Figure 1:
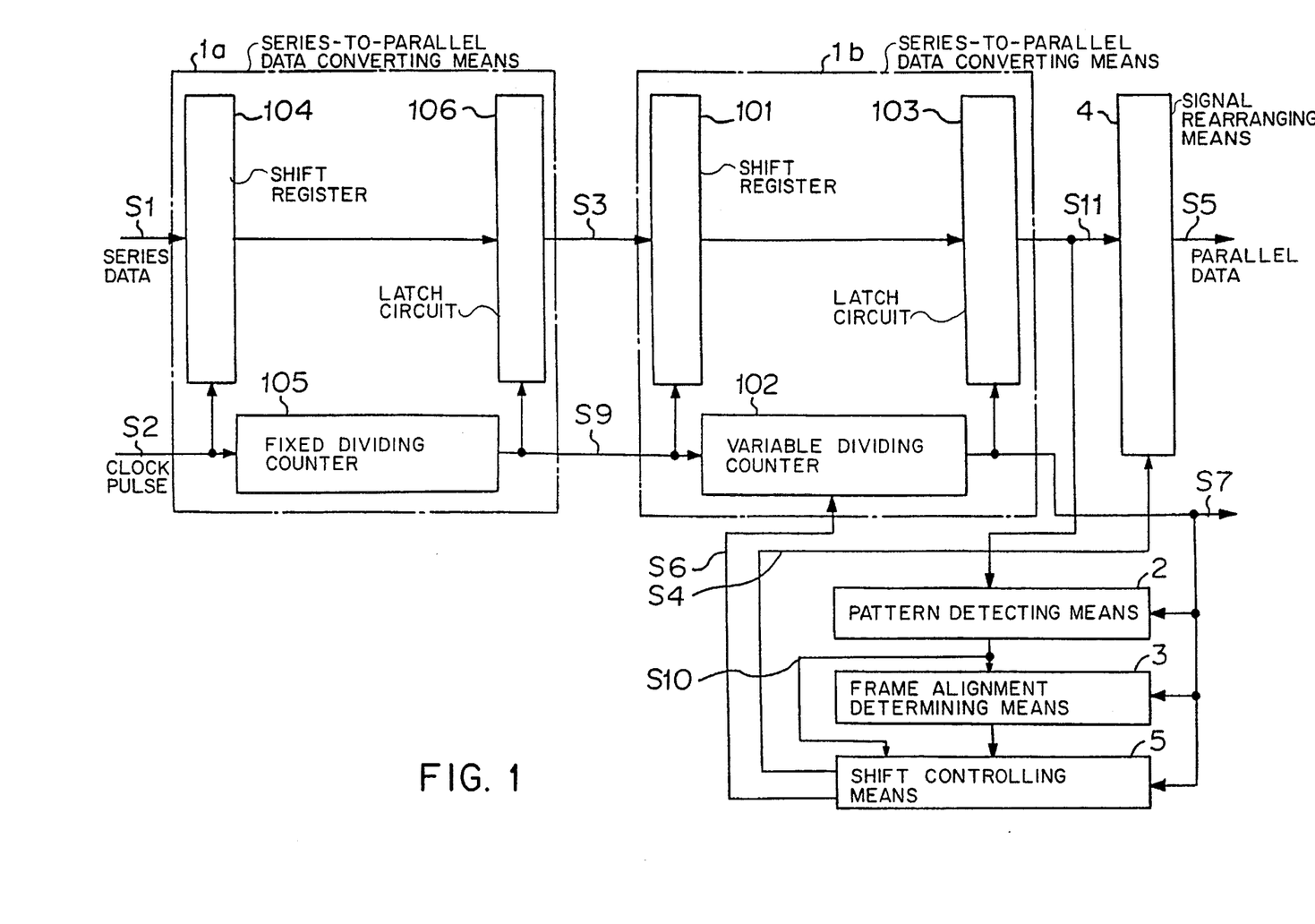
FIG. 1 is a construction diagram showing embodiment 1 of this invention.

FIG. 1 is a construction diagram showing embodiment 1 of a frame alignment circuit according to the present invention. In FIG. 1, a numeral 2 designates a pattern detecting means and a numeral 3 designates a frame alignment determining means which are constructed similar to those in the conventional Examples. The newly added portions are as follows. A notation 1a designates a series-to-parallel data converting means, 1b, another series-to-parallel data converting means, 4, a signal rearranging means and 5, a shift controlling means. The series-to-parallel data converting means 1b is constructed by a shift register 101, a variable dividing counter 102 and a latch circuit 103. The series-to-parallel data converting means 1a is constructed by a shift register 104, a fixed dividing counter 105 and a latch circuit 106. Furthermore, the shift controlling means 5 forms a shifting signal S6 and a selecting signal S4 based on a frame alignment pattern detecting result S10 which is detected by the pattern detecting means 2 and respectively controls the variable dividing counter 102 and the signal rearranging means 4.

The operation of the series-to-parallel data converting means 1a is the same as in the conventional cases. However, the number of stages is reduced. The inputted data is converted, for instance, by two bits data, and the converted data is transmitted, which is to be explained infra.

Figure 2:
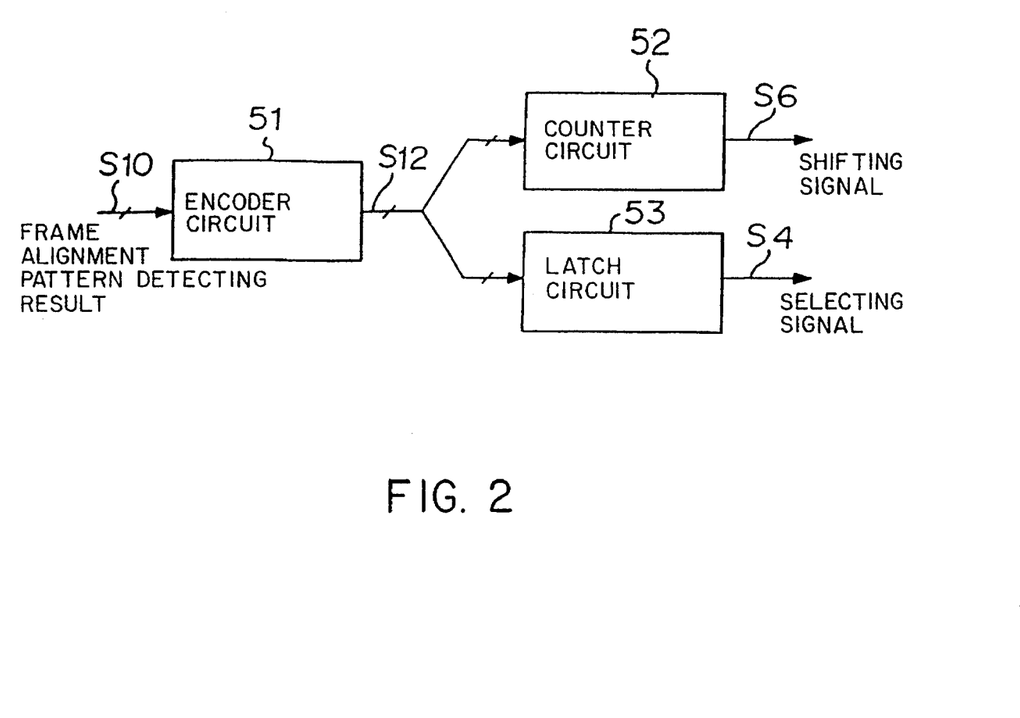
FIG. 2 is a construction diagram showing a shift controlling means in the embodiment 1 of this invention.

FIG. 2 is a construction diagram showing the shift controlling means 5. In FIG. 2, a reference numeral 51 designates an encoder circuit for outputting an encoded signal after binarizing the frame alignment pattern detection result S10, 52, a counter circuit for forming the shifting signal S6 based on an encoded signal S12, and 53, a latch circuit for forming a selecting signal S4 based on the encoded signal S12.

Next, explanation will be given to the operation. In this case, the series-to-parallel data converting means 1a performs 1 to 2 series-to-parallel conversion of a series data S1. The divided ratio of the fixed dividing counter 105 is "2", and the series-to-parallel data converting means 1b performs 2 to 8 series-to-parallel data conversion of a parallel data S3 and the divided ratio of the variable dividing counter 102 is set to 4.

First, the series-to-parallel data converting means 1a successively accumulates the received series data S1 in the shift register 104 while being shifted by a clock pulse S2. Since the divided ratio of the fixed dividing counter 105 is "2", a divided clock signal S9 is generated at every two cycles of the clock pulse S2. The latch circuit 106 latches all of the data currently stored in the shift register 104 in accordance with the divided clock signal S9 from the fixed dividing counter 105. The parallel data S3 which is latched by the latch circuit 106 and expanded and paralleled in two, is outputted to the series-to-parallel data converting means 1b along with the divided clock signal S9.

The series-to-parallel data converting means 1b successively accumulates the parallel data S3 from the series-to-parallel data converting means 1a in the shift register 101 while each of the parallel data S3 is being shifted by the divided clock signal S9. Since the divided ratio of the variable dividing counter 102 is set to "4" as mentioned above, a divided clock signal S7 is generated at every four cycles of the divided clock signal S9. The latch circuit 103 latches all of the data currently stored in the shift register 101 in accordance with the divided clock signal S7 from the variable dividing counter 102. A parallel data S11 which is expanded and paralleled in eight, is latched by the latch circuit 103 and is outputted to the signal rearranging means 4.

The parallel data S11 is also received by the pattern detecting means 2 which performs the detection of the frame alignment pattern. A frame alignment pattern detecting result S10 generated by the pattern detecting means 2 is transmitted to the frame alignment determining means 3 and the shift controlling means 5. The frame alignment determining means 3 matches the timings of the frame alignment pattern detecting position of the pattern detecting means 2 and a frame counter incorporated in the frame alignment determining means and performs the well-known front and rear protection.

Figure 3:
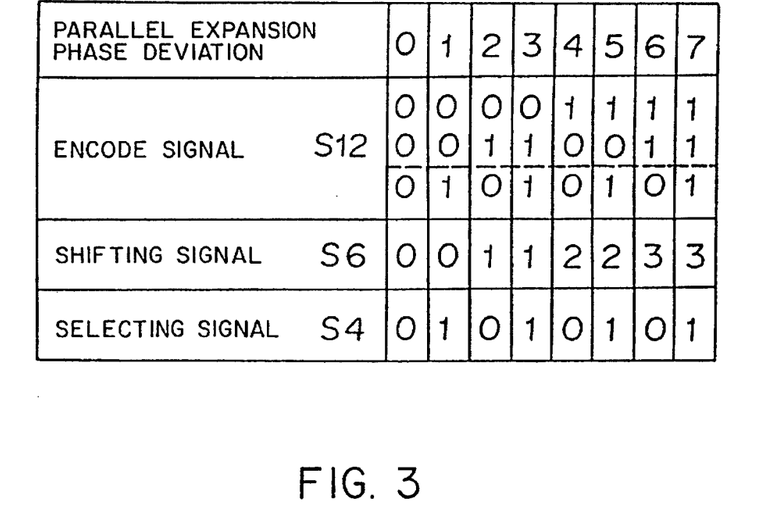
FIG. 3 is a diagram for explaining the operation of the shift controlling means in the embodiment 1 of this invention.

At this moment, when the parallel data S11 is not parallelly expanded in a predetermined order at recovery of the frame alignment, the shift controlling means 5 detecting this disorder, forms the shifting signal S6 which is in correspondence with a parallel expansion phase deviation with respect to the predetermined order, for the variable dividing counter 102, and the selecting signal S4 for the signal rearranging means 4. FIG. 3 is a diagram for explaining the control of the parallel expansion phase deviation by the shift controlling means.

Figure 4:
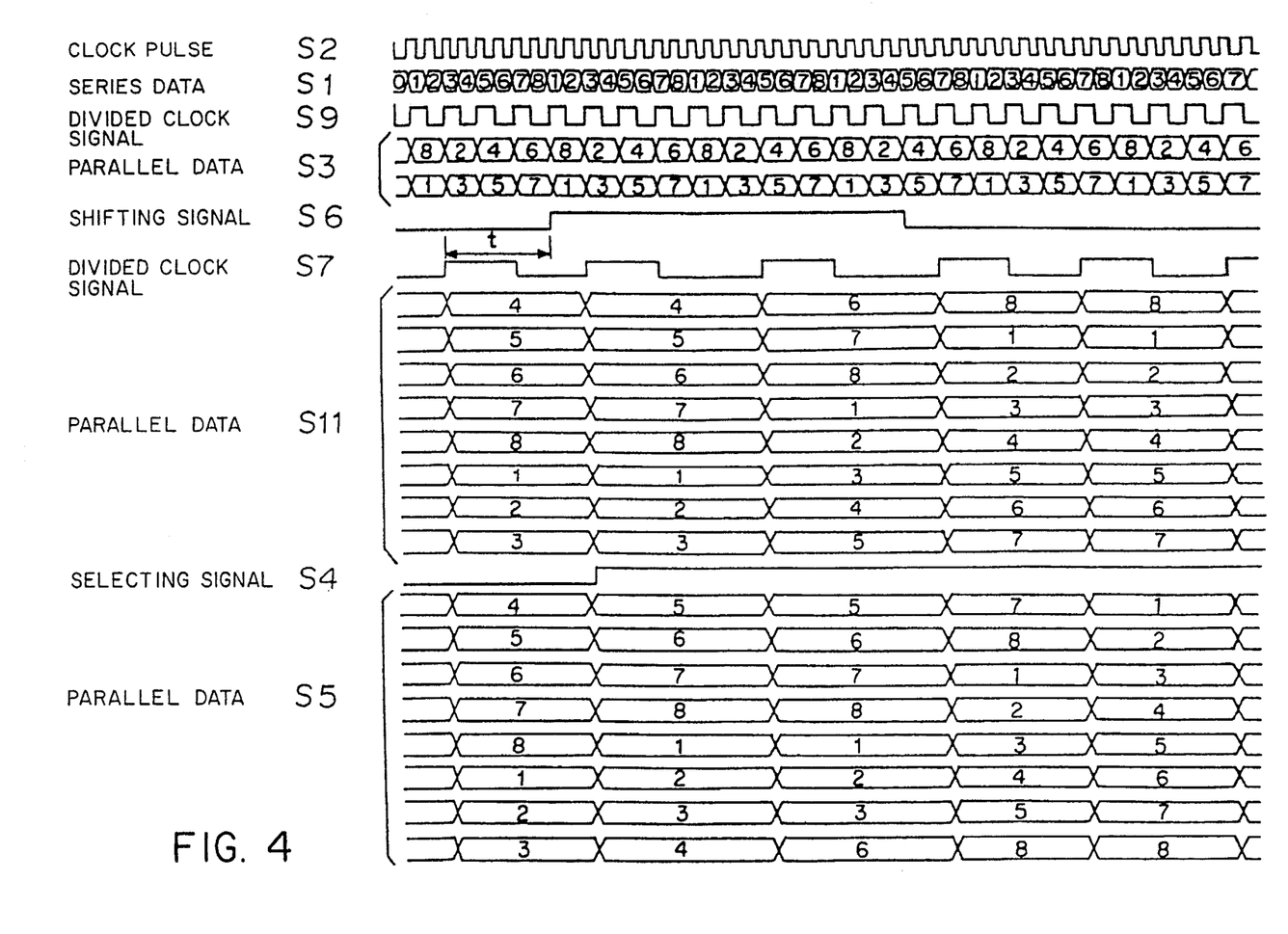
FIG. 4 illustrates timing charts for explaining rearranging of parallel data in embodiment 1.

The encoder circuit 51 binarizes the frame alignment pattern detecting result S10 and outputs the encoded signal S12. As shown in FIG. 3, the encoded signals S12 are "000", "001", "010", . . . "111" with respect to the parallel expansion phase deviation "0", "1", "2", . . . "7". The counter circuit 52 receives the preceding 2 bits of the encoded signal S12 and forms the shift signal S6 for "0", "0", "1", . . . "3" bits of the dividing clock signal S7 with respect to the parallel expansion phase deviation "0", "1", . . . "7" and output them to the variable dividing counter 102. Furthermore, the latch circuit 53 forms the selecting signals S4 by retaining the residual one bit of the encoded signal S12 and outputs them to the signal rearranging means 4. FIG. 4 illustrates timing charts for explaining the rearranging of the parallel data S5 which is performed by the variable dividing counter 102 and the signal rearranging means 4 at this moment. In this Example, a case is shown wherein the parallelly expanded order is deviated by 5 bits from the predetermined one and the shifting signal S6 by "2" bits and the selecting signal S4 of "1" are formed.

Furthermore, when the parallelly expanded phase deviations "0" and "2" are simultaneously detected in the frame alignment pattern detecting result S10, the encoder circuit 51 may be substituted by an encoder circuit with priority wherein the encoded signal S12 is "000" putting a priority on a deviation of a smaller parallel expansion phase deviation.

When the shifting signal S6 from the shift controlling means 5 is changed from "0" to "1", the variable dividing counter 102 changes the divided ratio thereof from "4" to "5" and successively performs the rearranging of the parallelly expanded order of the parallel data S11. After the second cycle of the divided clock signal S7, the parallel data 11 is in a state wherein the parallelly expanded order thereof is deviated from the predetermined one by 1 bit, the shift controlling means 5 resets the shifting signal S6 to "0", and the dividing ratio of the dividing counter 102 is set to "4". In this way, the parallel data S11 is maintained in a state wherein the parallelly expanded order thereof is deviated from the predetermined one by 1 bit.

The delay time "t" which is allowable in the control of the shifting signal S6, is almost equal to the cycle of the divided clock signal S7. Therefore, the circuit performing the control can be operated by the divided clock signal S7, which can be constructed by low-speed circuit elements.

In the shift controlling means, the divided value of the outputted encoded signal of the encoder circuit are respectively received by the counter circuit and the latch circuit. Therefore, even when the series-to-parallel data converting means are connected in multi-stages and the parallelly expanded number is increased, the respective parallelly expanded phase deviations can easily be determined, which can dispense with a complicated control.

Furthermore, in the signal rearranging means 4, when the selecting signal S4 from the shift controlling means 5 is changed from "0" to "1", the rearranging of the parallelly expanded order of the parallel data S11 is performed by 1 bit. In this way, the frame alignment is performed and the parallel data S5 in the predetermined parallelly expanded order is outputted from the signal rearranging means 4.

At this moment, the signal rearranging means 4 corrects only the parallel expansion phase deviation of the parallel data S11 produced by the series-to-parallel data converting means 1a. Therefore, even when the parallelly expanded number of the parallel data S11 is increased, the increase in the circuit size can be restrained.

Furthermore, in the above Example, for the convenience of the explanation, the series-to-parallel data converting means 1a performs the 1 to 2 series-to-parallel data conversion of the series data S1 and the series-to-parallel data converting means 1b performs the 2 to 8 series-to-parallel data conversion of the parallel data S3. However, the ratios may be set to 1 to n for the first series-to-parallel data conversion and n to m for the second series-to-parallel data conversion (n and m are integers).

Explanation has been given to the case wherein the device is constructed in two-stages of the series-to-parallel data converting means 1a and 1b. However, the device may be constructed by three or more stages wherein the series-to-parallel data converting means 1b are further connected in multi-stages. The divided ratios of the respective variable dividing counters may be set to different values. In this case, the shift controlling means 5 is provided with a construction wherein a plurality of the counter circuits 52 are arranged.

Furthermore, explanation has been given to the case wherein the expanded order of the parallel data is rearranged by increasing the divided ratio of the variable dividing counter by "1". However, the increase of the dividing ratio may be "2" or "3" or other values, or may be reduced with an effect the same with that in the above Example.

EXAMPLE 2

Figure 5:
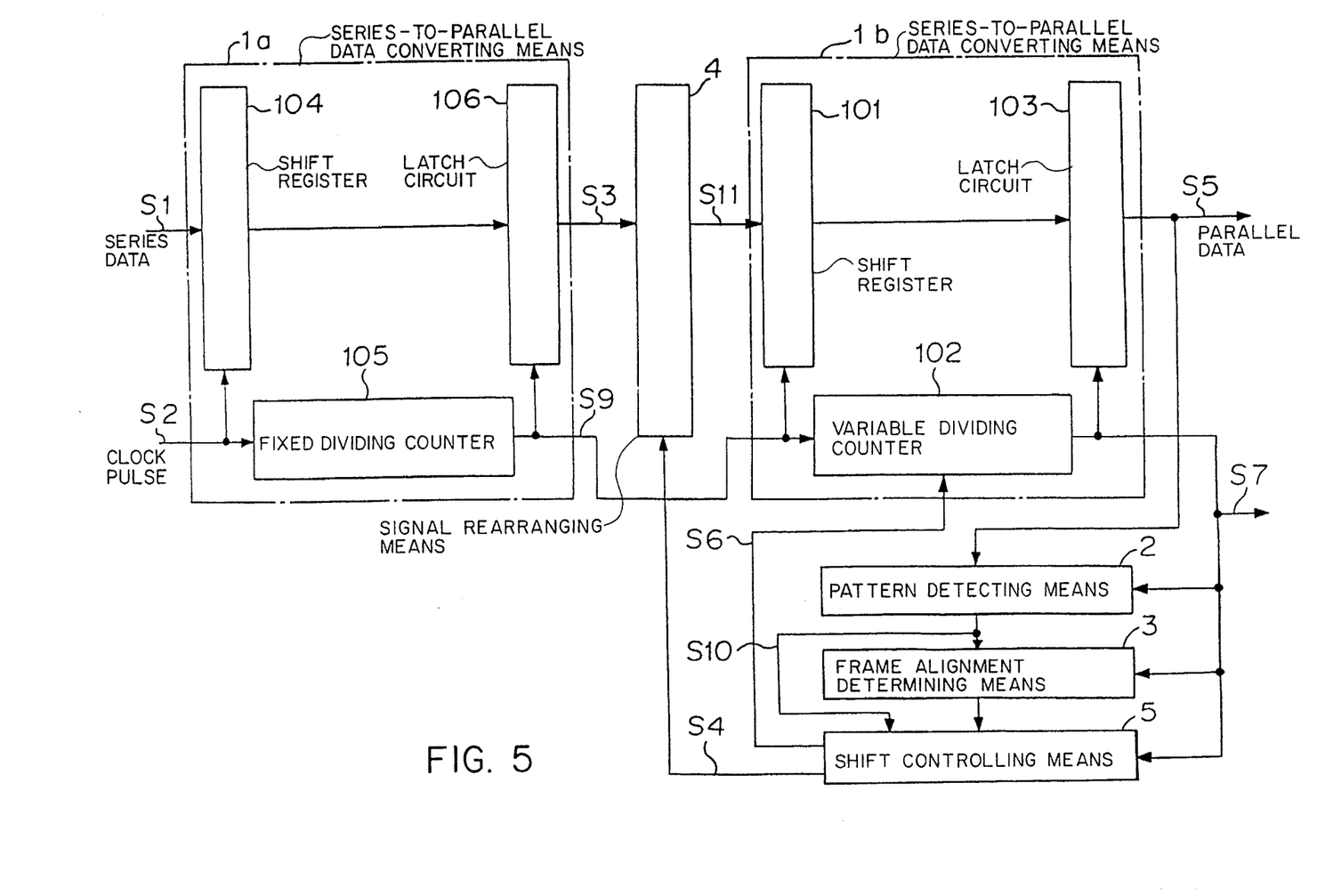
FIG. 5 is a construction diagram showing embodiment 2 of this invention.
Figure 6:
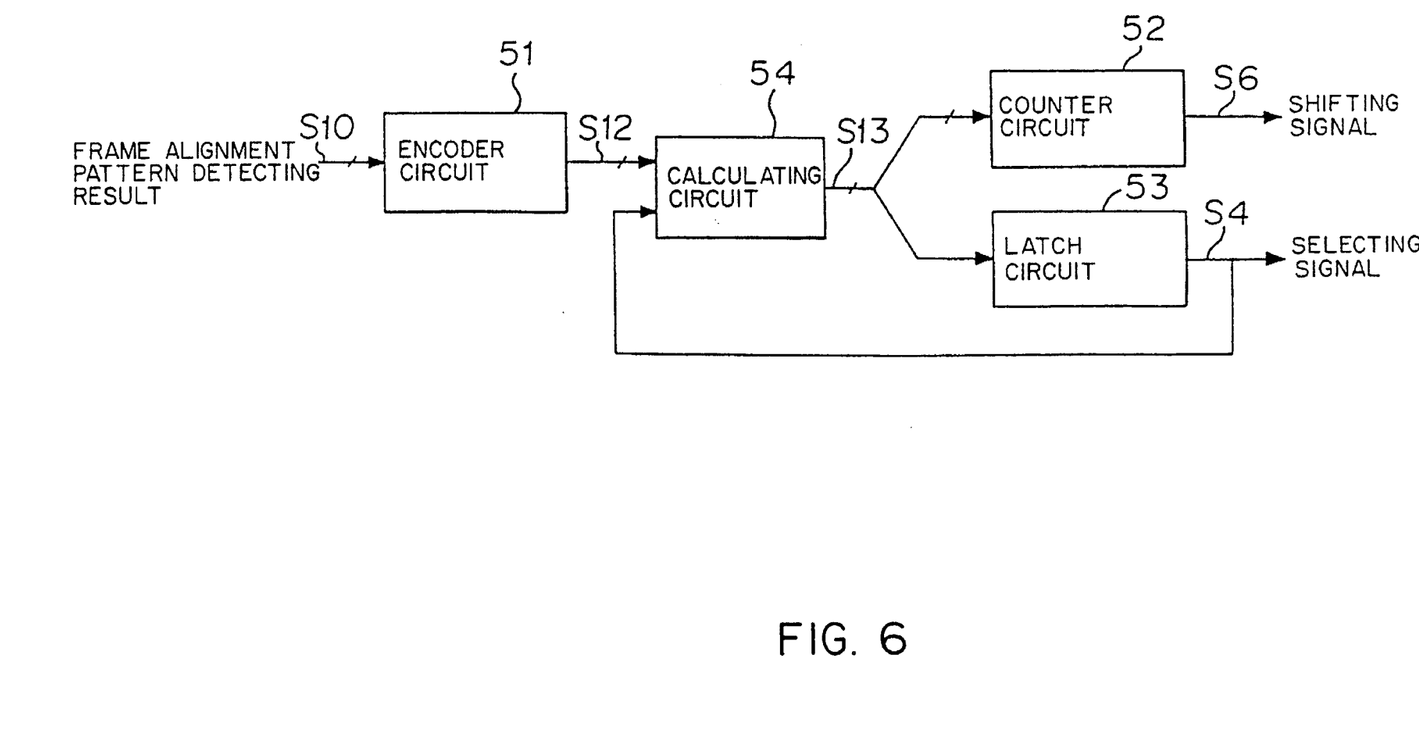
FIG. 6 is a construction diagram showing a shift controlling means in the embodiment 2 of this invention.

FIG. 5 is a construction diagram showing a case wherein the signal rearranging means 4 is disposed between the series-to-parallel data converting means 1a and 1b. FIG. 6 is a construction diagram showing a shift controlling means 5 in the embodiment of FIG. 5. In FIG. 6, a reference numeral 54 designates a calculating circuit for performing calculation of a selecting signal S4 and an encoded signal S12 and outputting a calculation result S13 to the counter circuit 52 and the latch circuit 53.

As in Example 1, the series-to-parallel data converting means 1a performs the 1 to 2 series-to-parallel data conversion of the series data S1 and the divided ratio of the fixed dividing counter 105 is set to "2", whereas the series-to-parallel data converting means 1b performs the 2 to 8 series-to-parallel data conversion of the parallel data S3 and the divided ratio of the variable dividing counter 102 is set to "4".

Figure 7:
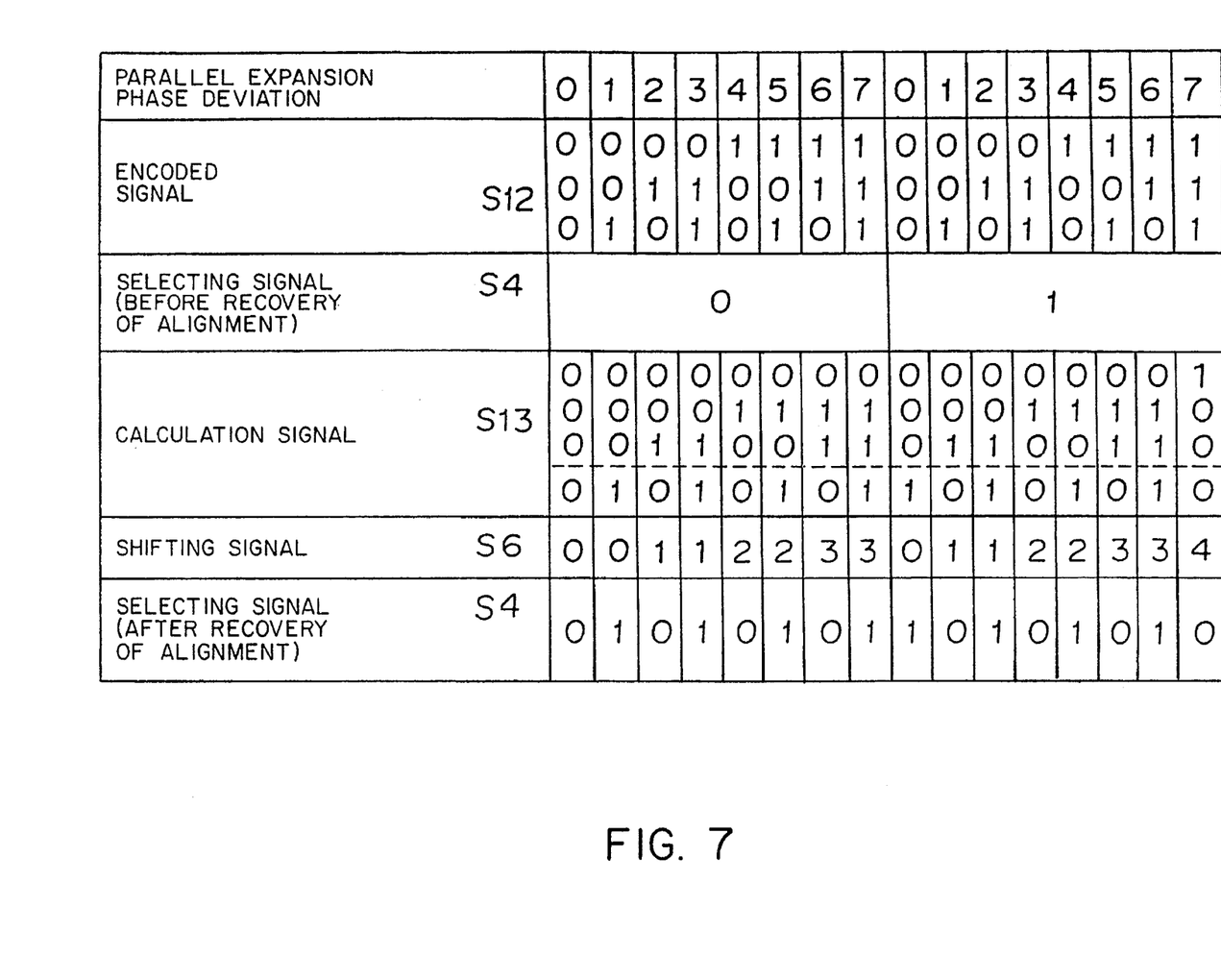
FIG. 7 is a diagram for explaining the operation of the shift controlling means in the embodiment 2 of this invention.

FIG. 7 is a diagram for explaining the control of the parallel expansion phase deviation by the shift controlling means at this moment.

Next, explanation will be given to the operation.

The calculating circuit 54 calculates the calculation result S13 in correspondence with the parallel expansion phase deviation by adding the selecting signal S4 which is retained before the recovery of the frame alignment, to an encoded signal S12. The counter circuit 52 receives the preceding three bits of the calculated result S13 and forms the shifting signal S6 with respect to the parallel expansion phase deviation and output it to the variable dividing counter 102. The latch circuit 53 forms the selecting signal S4 after the recovery of the frame alignment by retaining the residual one bit of the calculation result S13 and output it to the signal rearranging means 4.

Figure 8:
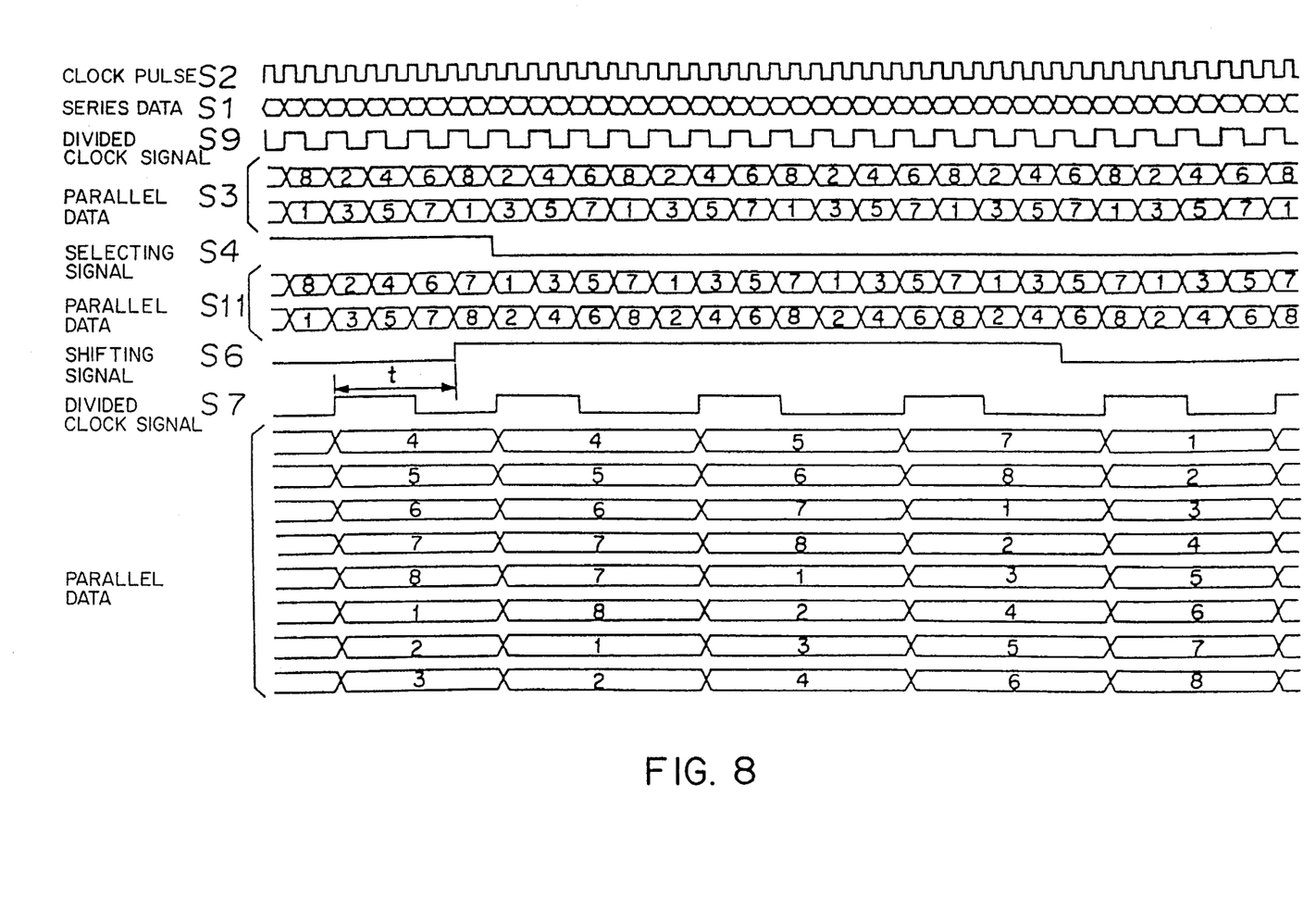
FIG. 8 illustrates timing charts for explaining rearranging of parallel data in the embodiment 2 of this invention.

FIG. 8 illustrates timing charts for explaining the rearranging of the parallel data S5 by the variable dividing counter 102 and the signal rearranging means 4 at this moment. In FIG. 8, the selecting signal S4 before recovery of the frame alignment is "1", and the parallelly expanded order is deviated from a predetermined one by 5 bits. By forming the shifting signal S6 for "3" bits of the dividing clock signal S7 and by setting the selecting signal S4 after the recovery of the frame alignment to "0", the parallel data S5 in the predetermined parallelly expanded order is outputted.

According to this Example, although the circuit element constructing the signal rearranging means 4 is required to operate by the divided clock signal S9 since the parallel expansion phase deviation by the series-to-parallel data converting means 1a is corrected by the parallel data S3, compared with Example 1, the circuit of the signal rearranging means 4 may further be downsized.

By providing the calculating circuit for performing the calculation of the encoded signal from the encoder circuit and the selecting signal before recovery of the frame alignment from the latch circuit, to the shift controlling means, even in the construction wherein the signal rearranging means are arranged among the series-to-parallel data converting means in multi-stages connection, the respective parallelly expanded phase deviations can easily be determined and a complicated control is not necessary.

Furthermore, in the above Example, the series-to-parallel data converting means 1a performs the 1 to 2 series-to-parallel data conversion of the series data S1 and the series-to-parallel converting means 1b performs the 2 to 8 series-to-parallel data conversion of the parallel data S3. However, 1 to n series-to-parallel data conversion and n to m series-to-parallel data conversion (n and m are integers) may be performed.

Furthermore, explanation has been given to the case wherein the device is constructed in two stages of the series-to-parallel data converting means 1a and 1b. However, the device may be constructed by three or more stages by performing a multi-stage connection to the series-toparallel data converting means 1b and the signal rearranging means 4 may be disposed between the series-to-parallel data converting means 1a and either one of the series-to-parallel data converting means 1b connected in multi-stage. In this case, the shift controlling means 5 is provided with a construction wherein a plurality of the counter circuits 52 are arranged in parallel.

Explanation has been given to the case wherein the expanded order of the parallel data is rearranged by increasing the divided ratio of the variable dividing counter by "1". However, the increase of the divided ratio may be "2" or "3" or other values. Furthermore, the calculating circuit 54 may perform subtraction wherein the divided ratio is reduced with an effect similar to that in the above Example.

EXAMPLE 3

In the above Examples, the signal rearranging means are used. However, the device may dispense with it and controls the counter 105 of the first series-to-parallel converting means 1a, depending on cases. In FIG. 5, the device transmits the selecting signal S4 from the shift controlling means 5 to the fixed dividing counter 105. Furthermore, the output of the series-to-parallel data converting means 1a (output of the latch circuit 106) S3 is transmitted to the input side of the series-to-parallel data converting means 1b (input of the shift register 101), as S11.

This operation is similar to Example 2.

When the alignment deviation is generated, and the selecting signal S4 of the shift controlling means 5 is set, for instance, to "1", the timing of the latching the series-to-parallel data converting means 1a is shifted by 1 bit and the normal latching is recovered.

As stated above, this invention is provided with the first and the second series-to-parallel data converting means, the frame alignment determining means and the shift controlling means for controlling the divided ratio of the counter based on the alignment deviation. Accordingly, the magnification of the circuit size is restrained, the size of the circuit wherein a high-speed operation is necessary, is minimized and yet the very high-speed operation is made possible.

According to a second aspect of the present invention, the device is provided with the shift controlling means which outputs the divided ratio shifting signal and the control signal to the other alignment deviation controlling means based on the detection of the alignment deviation. Therefore, the alignment deviation can be corrected easily in a short time even when the number of the input data of a single frame is increased or the number of the finally required parallel outputs is increased.

I claim:

1. A frame alignment circuit comprising:
   at least one series-to-parallel data converting means including:
      a shift register for receiving a clock signal and a first parallel data signal, accumulating the first parallel data signal and outputting an accumulated data signal;
      a latch circuit for receiving the accumulated data signal and a divided clock signal, for latching the accumulated data signal, and for outputting a second parallel data signal; and
      a variable counter for receiving the clock signal and a shifting signal, for dividing the clock signal, and outputting the divided clock signal;

a pattern detecting means for receiving the second parallel data signal, for detecting a frame alignment pattern of the second parallel data signal, and for outputting a frame alignment pattern detection result signal;
   a frame alignment determining means for receiving the frame alignment pattern detection result signal, for detecting a deviation of alignment of the frame alignment pattern detection result signal, and for outputting a deviation of alignment signal;
   a shift controlling means for receiving the deviation of alignment signal and the frame alignment pattern detection result signal, for expanding the deviation of alignment signal, and for outputting the shifting signal and a selecting signal; and
   wherein the shift controlling means includes:
   an encoder circuit which receives the frame alignment pattern detection result signal, encodes the frame alignment pattern detection result signal into a plurality of binary bits and outputs an encoded signal;
   at least one counter which receives the encoder signal, forms the shifting signal, and outputs the shifting signal to the at least one series-to-parallel converter; and
   a latch circuit which receives the encoded signal, retains a residual bit of the plurality of bits of the encoded signal, and outputs the residual bit as the selecting signal.

2. A frame alignment circuit comprising:
   at least one series-to-parallel data converting means including:
      a shift register for receiving a clock signal and a first parallel data signal, accumulating the first parallel data signal and outputting an accumulated data signal;
      a latch circuit for receiving the accumulated data signal and a divided clock signal, for latching the accumulated data signal and outputting a second parallel data signal; and
      a variable counter for receiving the clock signal and a shifting signal, for dividing the clock signal and for outputting the divided clock signal;
   a pattern detecting means for receiving the second parallel data signal, for detecting a frame alignment pattern of the second parallel data signal, and for outputting a frame alignment pattern detection result signal;
   a frame alignment determining means for receiving the frame alignment pattern detection result signal, for detecting a deviation of alignment of the frame alignment pattern detection result signal, and for outputting a deviation of alignment signal;
   a shift controlling means for receiving the deviation of alignment signal and the frame alignment pattern detection result signal, for expanding the deviation of alignment signal, and for outputting the shifting signal and a selecting signal; and
   wherein the shift controlling means includes:
   an encoder circuit which receives the frame alignment pattern detection result signal, encodes the frame alignment pattern detection result signal into a plurality of binary bits and outputs an encoded signal;
   at least one counter which receives the encoded signal, forms the shifting signal, and outputs the shifting signal to the at least one series-to-parallel converter; and a calculating circuit which receives the encoded signal and the selecting signal, adds the encoded signal to the selecting signal, and outputs a calculation signal and wherein the at least one counter circuit receives the calculation signal and forms the shifting signal.

3. The frame alignment circuit as claimed in claim 2, wherein the shift controlling means further comprises a latch circuit which receives the calculation signal and forms the selecting signal.

* * * * *